United States Patent Office 3,168,997
Patented Feb. 9, 1965

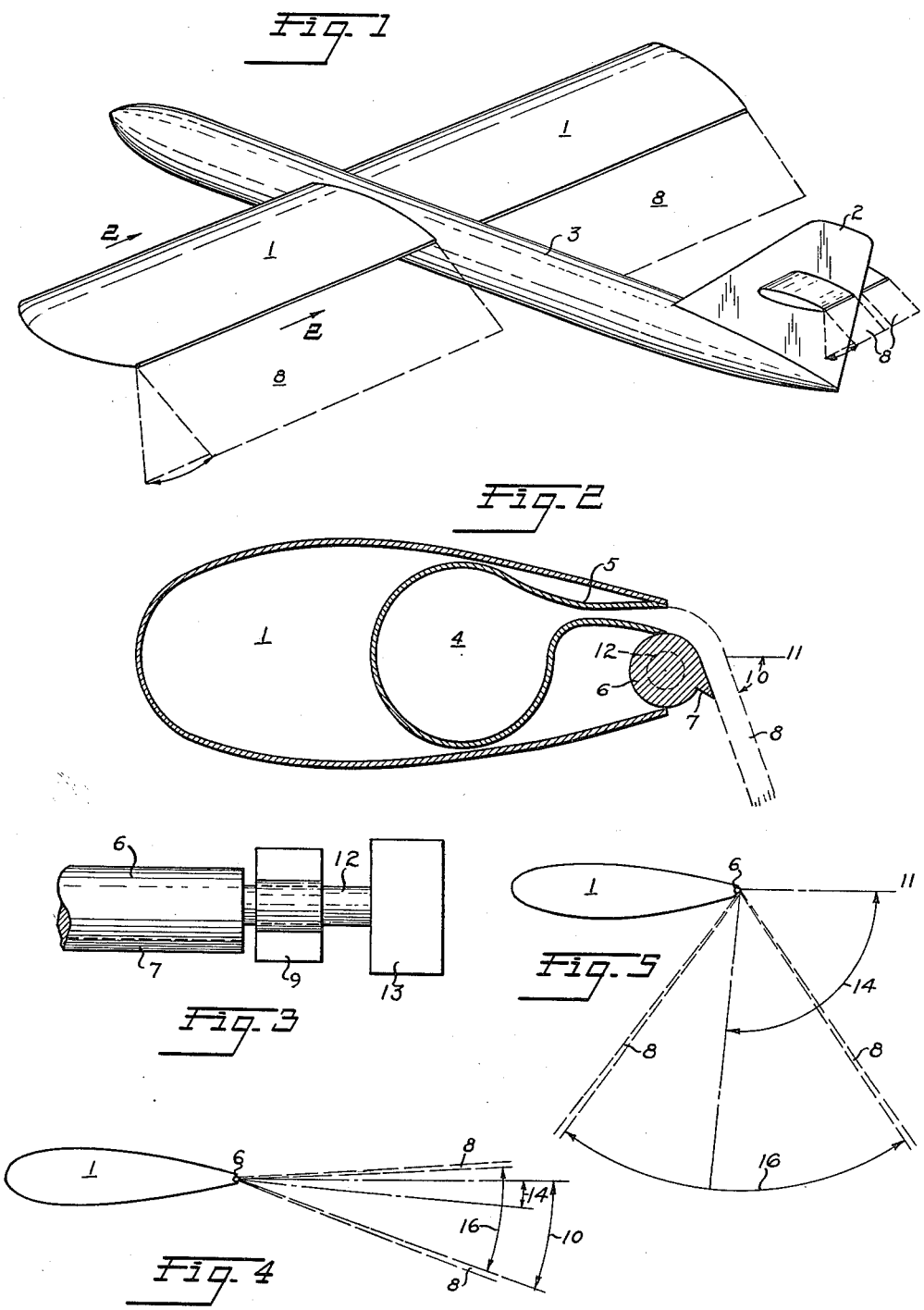

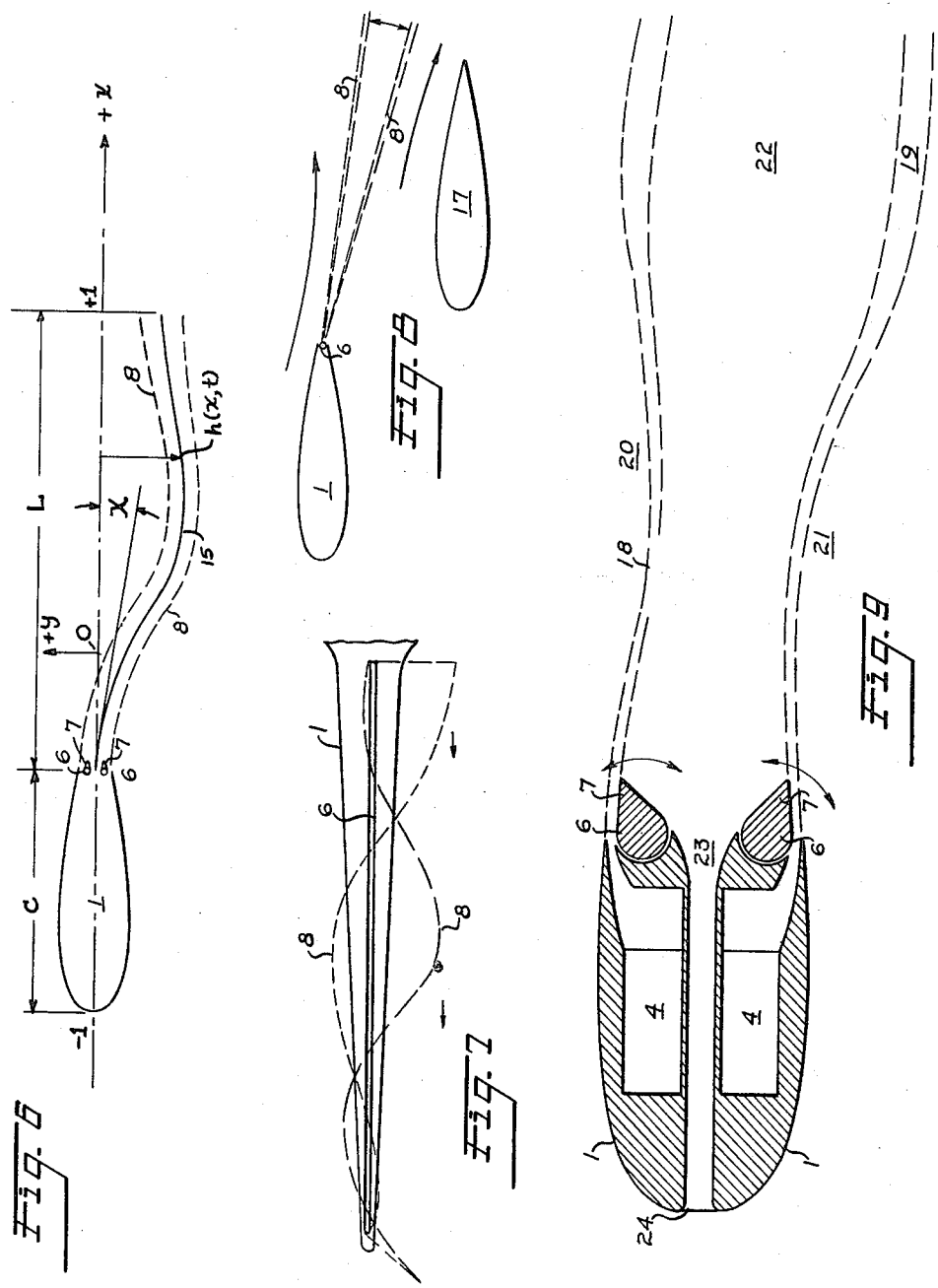

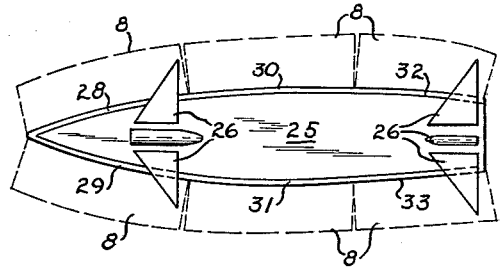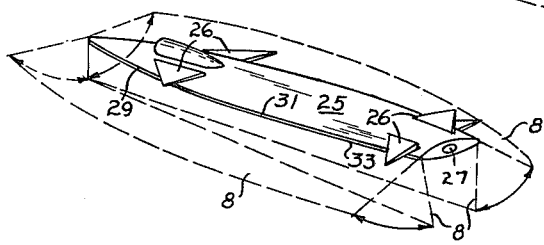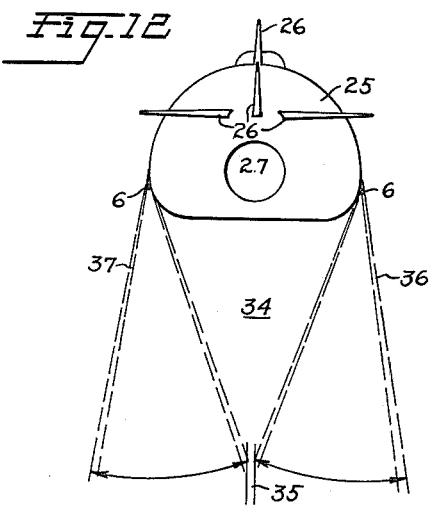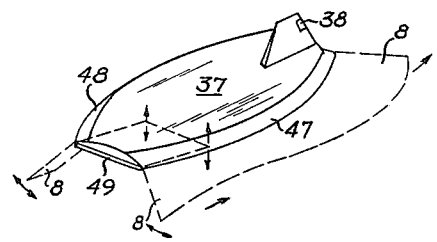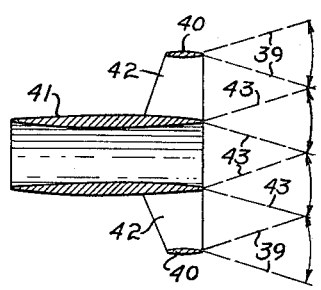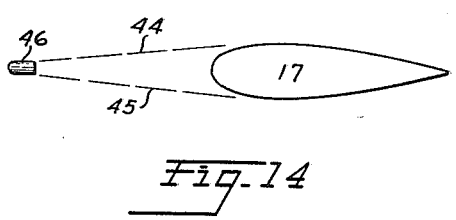

3,168,997
BEATING JET-WING AIRCRAFT
Walter Selden Saunders, 8014 Bradley Blvd.,
Bethesda 14, Md.
Filed Feb. 1, 1961, Ser. No. 86,527
11 Claims. (Cl. 244—12)

This invention is a novel flying machine. It is a combination of well known mechanical elements that yields a new and improved result.

Fixed wing aircraft are severely limited as transport devices by the tangential takeoff and landing requirements. Rotary wing aircraft do not have this limitation but their forward flight performance is seriously impaired by the fixed geometry of the rotating member. Flapping or beating wing aircraft may combine vertical takeoff and landing with efficient forward flight, however, none of these machines has flown successfully. As long as the power generated by a local engine is used to flap an extended rigid wing they will not be successful, unless there is a fantastic improvement in the strength of materials.

The object of my invention is to provide a novel aircraft with vertical take-off and landing and short take-off and landing capability that is combined with efficient high speed forward flight.

A further object is to provide a novel aircraft that will make a smooth transition from hovering and vertical motion to horizontal flight.

A further object is to provide novel means for controlling the aircraft.

Another object is to provide partial or total power-off landing capability for this novel aircraft.

Yet a further object is to provide optimum operating conditions for a jet engine.

Other objects will become obvious as the specifications proceed.

The invention consists in the combination of flapping jet wings and an airfoil system to sustain and propel an aircraft in whole or in part.

FIG. 1 is a perspective view of a conventional aircraft fitted with flapping jet wings.

FIG. 2 is a cross-section through the wing or tail as shown by the arrows in FIG. 1.

FIG. 3 is a schematic representation of the means to oscillate the jet wing.

FIGS. 4, 5, 6, 7, 8 and 9 show by diagrammatic views the relations between jet wings and airfoils under various conditions.

FIG. 10 shows a perspective of a missile-like aircraft with jet wings.

FIG. 11 shows the top view of this aircraft.

FIG. 12 shows the back view of this aircraft.

FIG. 13 shows a perspective of a disk shaped aircraft fitted with jet wings.

FIG. 14 shows a jet wing extension of a wing.

FIG. 15 shows a cross-section of a torus shaped aircraft using two sets of annular jet wings.

A simple embodiment of the invention is shown in FIGS. 1 and 2. The wing 1 and tail 2 of a conventional aircraft 3 contains a plenum chamber 4 which is connected to a compressed air source so that high pressure air or any suitable fluid is available all along the length of the airfoil. This air is converted into a high velocity jet sheet by means of the nozzle 5. This sheet travels around the Coanda director 6 until it reaches the edge 7 where it then detaches itself and becomes a free jet sheet, 8, leaving the entire trailing edge of the wing. The Coanda director is mounted in bearings 9, FIG. 3, so that the angle X shown by 10 of the jet sheet, 8, with respect to the cord line of the wing 11 may be varied by varying the angular position of the edge 7. If a periodic angular motion is given to the shaft end 12 of 6 by some means 13, FIG. 3, then the jet sheet 8 is caused to flap about some angle, $X_0$, 14, as shown in FIG. 4. This flapping jet sheet then induces an airflow around the wing 1. This induced airflow creates a pressure difference upon the wing which results in a force applied to the wing. If $X_0$ is small as in 14 of FIG. 4 the force produces both lift and thrust thus sustaining and propelling the aircraft efficiently in forward flight. If $X_0$ is made large as in 14 of FIG. 5 then the aircraft is provided with lift but little or no thrust thus allowing it to hover and land or take-off vertically.

Let the jet wing have a semi-flexible material 15 supported in its center by the pressures of each side of the jet 8, as shown in FIG. 6. It has a length, L, equal to some effective length of the jet at each point of the wingspan, along the trailing edge of the wing. The effective length of the jet sheet may be defined as that length at which the jet sheet will no longer support a pressure difference.

Let us establish the coordinate system shown in FIG. 6. The $x$ axis is on the center line of the wing with the leading edges at $x=-1$ and the end of the undeflected membrane at $x=+1$. The positive $y$ direction is measured upward and the coordinate of the wing span is $s$, positive outward. The position of the membrane is described as a function of the coordinate $x,s$ and the time $t$, by the function $$y=h(x,s,t)$$

At one point of the span, say $s_1$, the functional relation may take the form of $$h(s,x,t)=h(x)e^{j\omega t}$$

where $h_1(x)$ is an arbitrary real function of $x$ but may be complex with respect to $j=\sqrt{-1}$, and $\omega$ is the circular frequency. The usual convention that only the real part of this expression is used in the physical interpretation has been adopted.

To obtain an expression consistent with the published work of T. Yao-tsu Wu, "Swimming of a Waving Plate," U.S. Research Report PB 156 869 we make a change of variables by substituting $$x=\cos\theta$$

If the membrane is considered thin we may expand $h(x,\theta t)$ in a Fourier cosine series, $$h(x,t)=\left[\frac{1}{2}\beta_0+\sum_{n=1}^{\infty}\beta_n\cos n\theta\right]e^{j\omega t}$$

where $$\beta_n=\frac{2}{\pi}\int_0^\pi h_1(x)\cos n\theta d\theta, n=0,1,2,\ldots$$

are the Fourier coefficients as used by Wu (ibid.), and all other symbols used are consistent with his definitions. If the aspect ratio of the wing is large, and we assume for the moment that the rigid portion of the wing is a flat plate, then the flow in the plane of $s_1$ near the middle of the semi-span can be computed from Wu's results. In particular if the thrust intensity of the jet, $I=I(s,t)$ and/or the angular position of the jet $X=X(s,t)$ are forced to vary in a harmonic fashion then traveling waves of the form $$h(x,t)=\left(\sum_{m=0}^{\infty}b_m e^{j\epsilon_m x^m}\right)e^{j(\omega t-kx)}$$

with $\begin{cases}\text{wave length }\lambda=2\pi/k;\text{ constant phase, }\epsilon_m\\\text{wave number }k;\text{ and }m=0,1,2,\ldots\end{cases}$ will propagate along the membrane in the $x$ direction. This will result in power being transferred between the membrane and the surrounding air. From Wu (ibid.) we can compute this power, P, as well as the lift, L, the thrust, T, the moment, M, and the average value of these quantities. The extension of the problem to a three-dimensional wing of finite thickness can be accomplished by the usual methods of wing theory. If the membrane is removed and just the jet sheet is flapped an aerodynamic force will still be applied to the rigid portion of the wing.

If the amplitude, 16, of the jet sheet's initial angle as shown by the angles in FIGS. 4 and 5 is large and the velocity of the angluar sweep is low a relative large mass flow with low velocity will result. This is the condition of hover shown in FIG. 5. On the other hand, if the amplitude is small and the velocity is high then the mass flow in the average direction of the membrane is small but its velocity is high. This is the forward flight condition shown in FIG. 4.

If we expand $I(s,t)$ and $X(s,t)$ in double Fourier series, $$I(s,t) = \sum_{m=1}^{\infty} \sum_{n=1}^{\infty} a_{mn}\left(\sin\frac{m\pi s}{S} + \cos\frac{m\pi s}{S}\right)\left(\sin\frac{n\pi t}{\tau} + \cos\frac{n\pi t}{\tau}\right)$$

$$X(s,t) = \sum_{m=1}^{\infty} \sum_{n=1}^{\infty} c_{mn}\left(\sin\frac{m\pi s}{S} + \cos\frac{m\pi s}{S}\right)\left(\sin\frac{n\pi t}{\tau} + \cos\frac{n\pi t}{\tau}\right)$$

where S is the semispan length and $\tau$ is the period of the angular motion, then the Fourier coefficients $a_{mn}$ and $c_{mn}$ measure controlling parameters of the flow as long as the average power transferred, $<P>$ of Wu, is a significant feature of the flow. These parameters may be varied by varying the angular motion imparted to each segment of a jet wing by its driving mechanism 13 of FIG. 3. Such a segmented jet wing is shown in FIG. 11. The intensity of each segment may also be varied by varying the enthalpy of the gas in its plenum chamber 4 of FIG. 2. The result of varying each parameter may be computed from Wu's theory, ibid., and the theory of the jet flap. Therefore the proper design may be obtained for any particular aircraft. In performing these calculations it should be remembered that the intensity of a three dimensional jet sheet at the point $(x,y,s)$ may depend on the initial intensity all along the nozzle, especially if this nozzle is constructed to have an initial dispersion in the $s$ direction.

Further control can be obtained by applying different values of the parameters between the starboard and port wings and tail surfaces. See FIG. 1. Lateral translation of a wing in its own plane may also be achieved. This is done by propagating a travelling wave laterally along the jet wing by properly varying the phase of its parameters between segments or at each point as shown by the arrows in FIG. 7. This could be achieved by forcing the Coanda director 6 to twist along its length. For example if the Coanda director is driven hard at the wing root the natural direction of the torsional travelling waves would be toward the tip, and the force on the wing would be in the opposite direction. This can be understood from the above by simply interchanging $x$ and $s$ properly.

Another embodiment of the invention is shown in FIG. 8. Here, the jet sheet is propagated from the trailing edge of one airfoil 1 and the induced flow is allowed to pass over another airfoil 17 where it produces additional lift and thrust.

Another embodiment is shown in FIG. 9. Here the airfoil 1 has two jet sheets 18 and 19 leaving its trailing edge. This allows for three working areas in the flow: 20 above the wing; 21 below the wing; and 22 the interaction region of the two jet streams. This region, 22, may also be filled by a different energy level gas from another nozzle within the wing, 23. In FIG. 9 this gas is shown as coming from the leading edge of the wing, 24, and may be the cooling air.

The air in the external flow now sees a jet wing of finite thickness. This thickness can also be made to vary periodically and in a controlled way by varying each jet sheet as described above due to the interaction region 22 and the initial phase difference between the upper and lower jet sheets further control over the external flow may be achieved. This pulsating jet airfoil now propels and sustains the aircraft in conjunction with fixed airfoils. By proper placement of the Coanda directors a counterbalancing of the direct jet thrusts against each other, as well as against pulsations in the external flow, may be achieved, as may efficient use of inertial effects.

FIG. 10 shows another embodiment of the invention. 25 represents an aircraft design for high speed flight which is similar to a missile. It is fitted with small fins for control, 26, and a jet propulsion system exhausting at 27. For high speed flight it is sustained by its own compression wave (as in the B-70 aircraft) and jet deflection and hence needs no conventional wings. For low speed flight, however, the fuselage 25 is fitted with jet wing sources as shown in FIG. 11 by 28, 29, 30, 31, 32, 33, each pair 28 and 33, 30, and 31, and 32 and 29 connected to an independent jet power source to minimize the hazard of engine failure. Of course each jet wing may also be connected to more than one power source; for a possible dual arrangement see FIG. 9. If these jet wings all flap in unison as shown in FIG. 12 then the region 34 becomes a high pressure region sealed by the interaction zone 35 of the starboard 36 and port 37 jet wings. The fuselage 25 and region 34 together make for a streamlined airfoil body for the induced flow of the flapping jet wings. This induced flow then results in a reaction pressure on the body thus lifting it vertically off the ground. The body may be maneuvered by applying differential control as described above to any one or more of the segments of jet wings. In particular a forward speed may be obtained by propagating a travelling wave between the segments of the jet wing back from the nose to the tail of the aircraft as described in connection with FIG. 7. These jet wings may also be used as stationary jet flaps to aid the lift and maneuver of the aircraft in certain flight regimes.

The aircraft may also be made in the general form of a disk or lensatic 37 as shown in FIG. 13. Here a jet wing 8 is placed all around the edge of the disk. As before lift and thrust in any direction may be obtained by properly varying the phases and values of the various parameters $a_{mn}$, $b_{mn}$, $\tau$, of the flapping jet wing. Stabilizing and controlling airfoils can also be added as shown by 38.

An annular jet wing may also be used for propulsion as shown in FIG. 15. Either a curved or segmented jet wing 39 is propagated from the edge of an annular airfoil 40, supported from the body of the aircraft 41 by farings 42. The aircraft is also shown in annular shape supporting another jet wing 43. The motion of the jet wing annuluses is shown by the arrows and this motion induces an airflow which propels and sustains the craft as before. The same control and optimizing parameters may be used.

We have already exploited the interaction between two or more jet sheets. Now we will exploit the interaction between a jet sheet and another airfoil or the ground. In FIG. 8 we see a relation between the induced flow from a flapping jet sheet 8 and another airfoil 17. Suppose we now convert the flapping jet sheets into two steady jet sheets, 44, 45, propagating from a small airfoil 46, over the large one 17, as shown in FIG. 14. They form a structure seen by the air flow as a single unit. If the angle of attack of this unit is properly adjusted and the airfoils or portions thereof are moved we can produce a very low drag body with the outline of 46, 44, 45 and 17 respectively. Thus we can adapt our aircraft to the prevailing flight conditions by turning on or off certain jet wings and changing others from flapping jet wings into steady ones. In the example, 46 of FIG. 14 is changed to steady motion for high speed flight while the jet wing of 17 is turned off. In hovering flight both jet wings are oscillated to pump additional air. Of course these can be added in various combinations of parallel and series arrangements. An example of such an arrangement is shown in FIG. 8.

To see the interaction of the jet wing with the ground, consider FIG. 13 again. Let the disk 37 with peripheral jet wing 8 be what is conventionally known as a ground effect car. In such a machine it is usual to use a fairly low velocity fixed jet sheet interacting with the ground to confine high pressure air under the car thus supporting it. A flapping jet wing will have this same sealing effect with the ground but will in addition pump the surrounding air through the duct formed in whole or in part by the jet wing itself. The disk 37 is shown elongated with a duct formed by the sides 47 and 48. The side jet wing 8 is shown with a travelling wave moving back in the direction of the arrow. The forward portion of the jet wing 49 is shown also pumping air back through the machine. Of course the ground effect of the flapping jet wing could be exploited with any of the other embodiments of the invention.

In all of these jet wings it should be noted that the jet sheet need not be continuous. Indeed a series of small round nozzles would serve just as well if they are closely spaced. The ejector action of such an arrangement may even be an advantage.

In addition to providing vertical take-off and landing and improved maneuvering capability my invention provides other advantages. Since the momentum of the jet is not the only source of thrust, this machine allows for higher jet velocities. This means a higher temperature and pressure exist in the plenum chamber before the nozzle than in conventional engines operating under the same flight conditions. Hence, what is conventionally known as afterburning in a jet engine may be employed here with high efficiency. The engine handles more energy per unit mass flow and therefore we can get more horsepower per pound of engine weight. This is especially true when plasma techniques are used. A plasma is a gas in partial or fully ionized state and it is clear that this does not affect the principle of operation of a jet wing. Exhausting the jet in a thin sheet also raises the spectrum of the noise power generated so that it attenuates much faster in the air. The sound intensity at any one point is less and therefore the structural fatigue problem is reduced.

The advantages of applying the propulsive power throughout the wake of any aircraft thus restoring it to the free stream velocity are well known. A further advantage accrues from this type of placement of a jet power plant in that the mixing occurs in a low pressure region thus augmenting the thrust.

It can be seen therefore that if flapping jet wings are added to conventional aircraft and rockets either as the entire propulsion system or as an auxiliary system, then the aircraft will have improved efficiency as a transport device.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:
1. An aircraft comprising a body, a flexible membrane, and means for producing a beating jet sheet and means to support said membrane so that a portion coincides with said jet sheet.

2. A fluid moving machine comprising a source of high enthalpy fluid, an elongated nozzle attached thereto, a Coanda director supported by suitable means substantially parallel to the elongation of the nozzle, and means to impart a periodic angular motion to said director about its enlongated axis.

3. In an aircraft comprising a body shaped as an elongated lensatic, substantially parallel ducts along either side thereof, and means of producing beating jet sheets emanating from said ducts.

4. A body means for producing a jet sheet emanating from within a trailing edge of said body, and means for flapping continuously said jet sheet with respect to said body said jet sheet being free from impingement upon any major structure rearwardly of said jet sheet.

5. An aircraft with at least one airfoil surface, means for producing a jet sheet emanating from the trailing edge of said airfoil, and means for beating said jet sheet with respect to said airfoil so that the average, direction of said jet sheet is declined at a substantial angle downward from the horizontal line of flight of said aircraft, thereby augmenting the lift of said airfoil.

6. An aircraft with at least one airfoil surface, means for producing a jet sheet emanating from the trailing edge of said airfoil, means for continuously flapping said jet sheet, and means for changing the average, direction of said flapping jet sheet between a downward direction and a rearwardly direction.

7. An aircraft comprising a body, means for producing a jet sheet emanating from said body, mean for producing a second jet sheet emanating from said body, and means for simultaneously flapping said jet sheets with respect to said body and with respect to each other, so that a major component of the oscillating force is counterbalanced.

8. An aircraft comprising a body, means for producing a segmented jet sheet emanating from said body, and means for continuously flapping said jet sheet with respect to said body, said jet sheet being free from impingement upon any major structure downstream of said jet sheet, and means for varying the parameters of the flapping jet sheet differentially among its segments so as to effect control of said aircraft.

9. An aircraft comprising a body, an airfoil thereon, means for producing a jet sheet emanating from said body and passing near to but not contacting one side of said airfoil, and means for beating said jet sheet with respect to said airfoil.

10. A substantially annular body, means for producing a substantially annular jet sheet emanating from along the edge of said body, and means for continuously flapping said jet sheet with respect to said body, said jet sheet being free from impingement upon any major structure rearwardly of said body.

11. In an aircraft shaped as an elongated lensatic, ducts along either side thereof, and means of producing beating jet sheets emanating from said ducts.

References Cited in the file of this patent
UNITED STATES PATENTS
2,961,192    Davidson _____ Nov. 22, 1960
3,068,642    Schmidt _____ Dec. 18, 1962